Dec. 8, 1959   A. N. STANTON   2,916,279
ACCELERATION AND VELOCITY DETECTION DEVICES AND SYSTEMS
Filed March 19, 1956   4 Sheets-Sheet 1

INVENTOR
Austin N. Stanton
BY Wm. T. Wofford
ATTORNEY

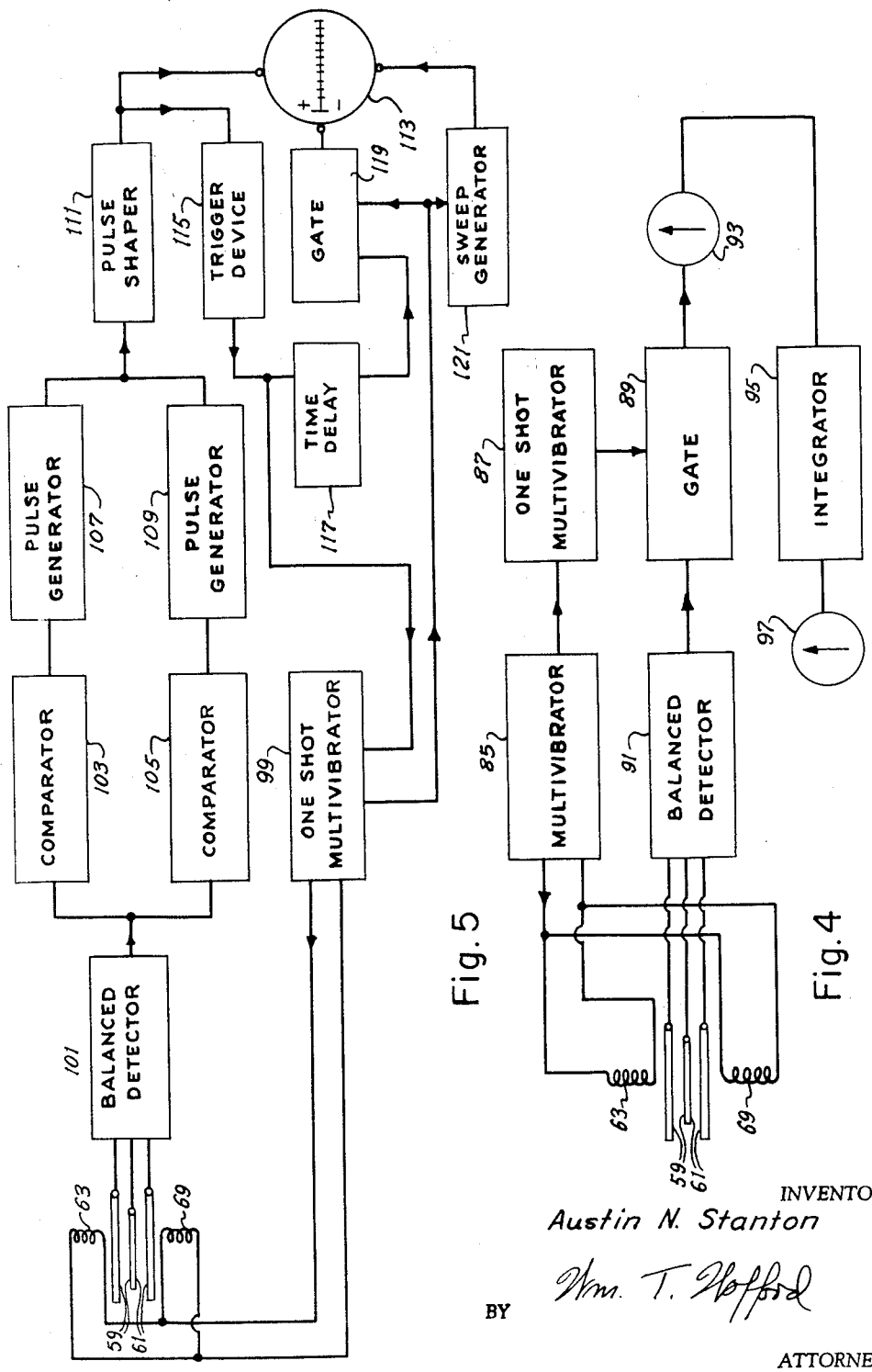

Dec. 8, 1959  A. N. STANTON  2,916,279
ACCELERATION AND VELOCITY DETECTION DEVICES AND SYSTEMS
Filed March 19, 1956  4 Sheets-Sheet 3

INVENTOR
Austin N. Stanton

BY Wm. T. Hofford

ATTORNEY

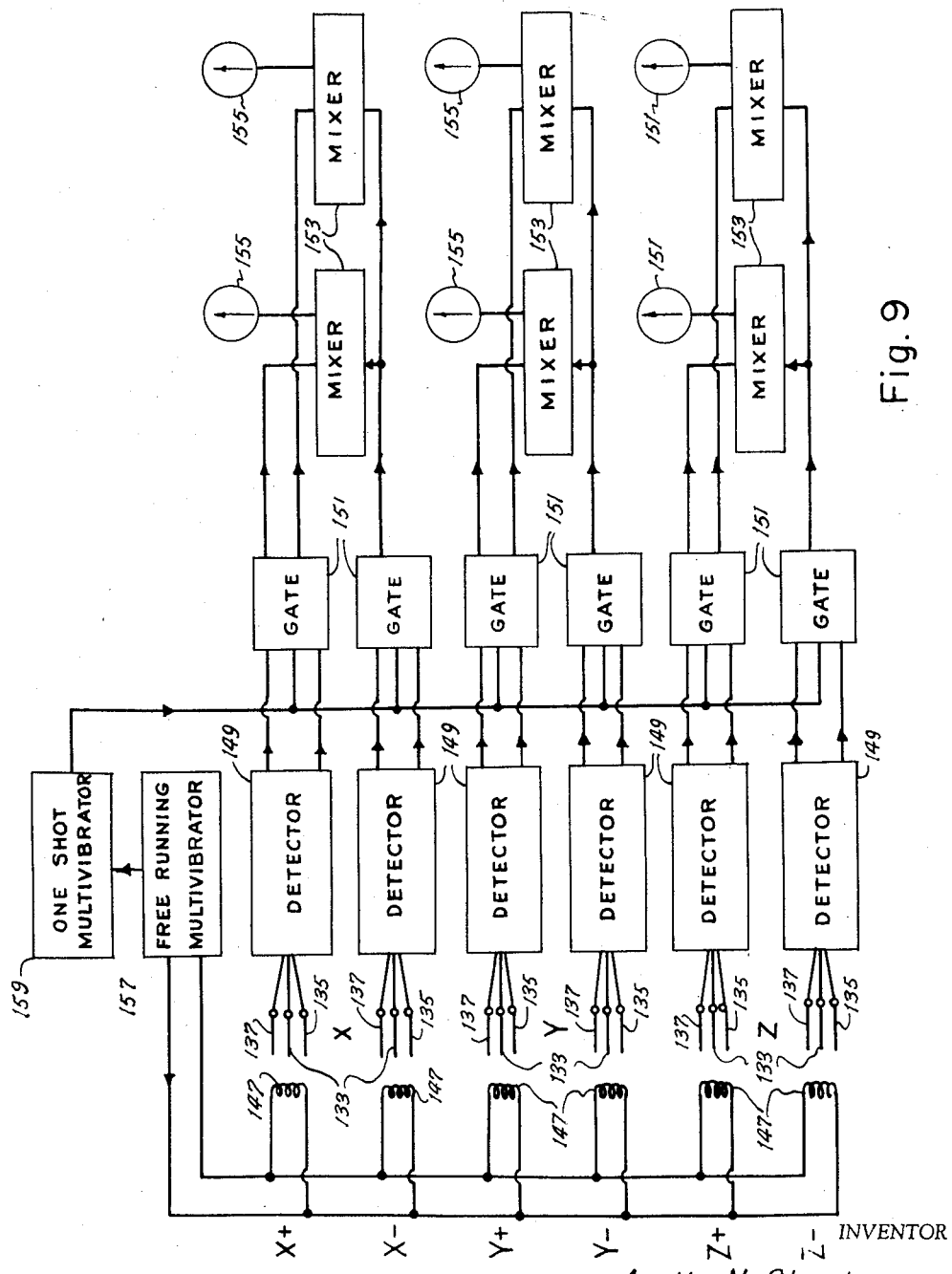

United States Patent Office 2,916,279
Patented Dec. 8, 1959

2,916,279

ACCELERATION AND VELOCITY DETECTION DEVICES AND SYSTEMS

Austin N. Stanton, Garland, Tex.

Application March 19, 1956, Serial No. 572,358

15 Claims. (Cl. 264—1)

My invention relates to devices and systems for detection and determination of acceleration and velocity of a body, and particularly to improved devices for producing signals which are a function of accelerations and velocities of the body.

Acceleration detection devices have been conventionally considered as spring supported bodies or masses, with means for measuring the position or change of position of the mass with respect to the support frame, or the system under study. In cases where only transient phenomena are to be measured, such as at a fixed seismographical station, a heavy weight may be suspended from a weak spring so that the mass-spring natural vibration period is very long and yet the mass displacement will not be excessive. However, in the cases of systems subject to variable velocities and accelerations having large time integrals, such weak spring system is not practicable, since the mass would soon strike the support frame. Consequently, in the latter cases, strong magnetic springs have heretofore been employed, so that very little mass-to-support frame displacement takes place; the natural period of the mass-spring is very short; and the resonant frequency is above the highest frequency vibrations or accelerations to be measured. Since the mass and spring constitute a resonant system, errors of measurement are introduced by the fact that the sensitivity is different for different frequencies. Research and development in this field has been concentrated on the reduction of errors resulting from various phenomena such as friction, resonance, and damping in conventional systems. Such effort has not shown great promise, and it has become apparent that really substantial advances must come from fresh new approaches to the general problem. An ideal type of acceleration and velocity detection device would be one wherein a mass progresses through space in accordance with Newton's first law of motion, with means for detecting and measuring the relative displacement between the mass and a reference frame which is being accelerated by outside forces. It is, of course, impractical to have a reference frame large enough to accommodate such a system. This difficulty is overcome in conventional accelerometers by applying mechanical springs to force the mass to accompany the frame, with resulting severe limitation as aforementioned.

It is accordingly a general object of my invention to provide improved acceleration and velocity detection devices and systems.

More specifically it is an object of my invention to provide acceleration and velocity detection device and system which do not employ mechanical springs.

It is another object of my invention to provide improved acceleration and velocity detection devices and systems which in operation closely approach the concept of the ideal type detection device hereinbefore mentioned.

Another object of my invention is to provide acceleration and velocity detection devices and systems which are closely equivalent to an idealized arrangement wherein a mass progresses through space in accordance with Newton's first law of motion, with means for detecting the accelerations and/or velocities of a reference frame relative to the mass, even though these accelerations may involve variable velocities and long time integrals.

Another object of my invention is to provide novel arrangements for imprisonment of a Newtonian mass.

Another object of my invention is to provide novel arrangements for imprisonment of a Newtonian mass which allow detection of accelerations and/or velocities in multiple dimensions.

These and other objects are effected by my invention as will be apparent from the following description taken in accordance with the accompanying drawings, forming a part of this application, in which:

Fig. 4 is a schematic block diagram of an accelerometer and velocity meter device utilizing the displacement sensing device of Fig. 1, in accordance with one embodiment of my invention;

Fig. 5 is a schematic block diagram of an accelerometer device utilizing the displacement sensing device of Fig. 1, in accordance with another embodiment of my invention;

Fig. 9 is a schematic block diagram indicating electric circuit connections adapting the magnetic suspension and displacement detection device of Fig. 6 for use with circuits similar to that shown by Fig. 4.

Figure 1:
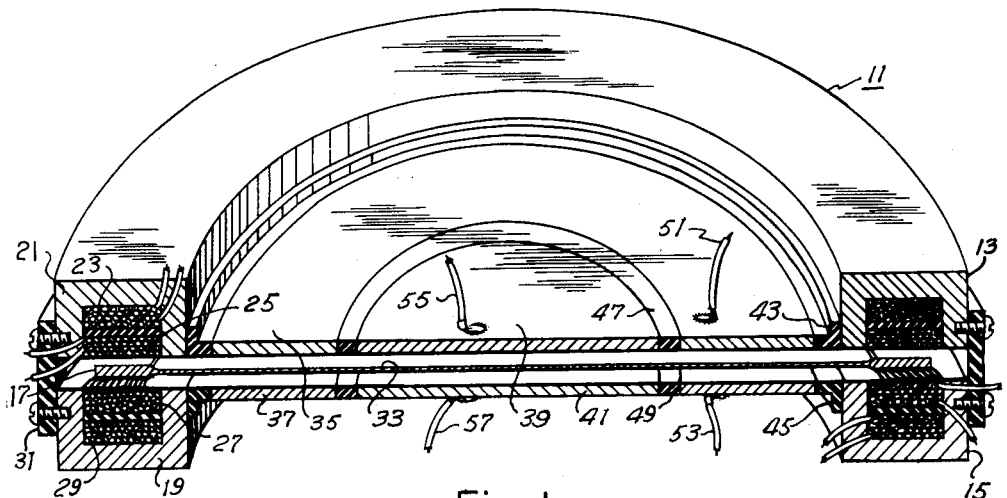
Fig. 1 is a schematic sectional perspective view of a magnetic suspension and displacement sensing device in accordance with a preferred embodiment of my invention.

Turning now to Fig. 1, there is shown a magnetic suspension or imprisonment and displacement sensing device 11 wherein a pair of controllable field electromagnets 13, 15 are utilized to imprison a permanent magnet 17 and wherein parts associated with the electromagnets together with parts associated with the permanent magnet form variable capacitances, all in such manner that the variable capacitances may be utilized to sense relative motion of the electromagnets with respect to the permanent magnet. The electromagnets are substantially identical. The core 19, 21 of each electromagnet is in the shape of an annulus having channel cross section, with the channel bottom lying in a plane perpendicular to the annulus central axis. A pair of separate coils 23, 25, 27, 29 are wound in the channel of each electromagnet for purposes to be hereinafter explained. The electromagnet cores are disposed so that their central axes coincide, with the channels facing each other, and the faces of the channel wall extremities spaced apart. The electromagnets are held in fixed relation to each other by a cylindrical band 31 of non-magnetic material fixed to the outer peripheries of the electromagnets. The permanent magnet 17 is in the shape of a flat ring, magnetized so that its inner peripheral portion is a south pole and its outer peripheral portion is a north pole. The permanent magnet ring is disposed between the electromagnets and so that its central axis coincides with the central axes of the electromagnets. The inner diameter of the permanent magnet ring is made greater than that of the inner electromagnet channels, and the outer diameter of the ring is made less than that of the outer electromagnet channels. The electromagnets are always energized so that a south pole is present at the end face of the channel inner wall, and a north pole is present at the end face of the channel outer wall. These polarities can be of course be reversed if the polarity of the permanent magnet is also reversed. In some cases only one coil of each electromagnet is used, and in some cases both are used, depending upon the type of system in which the imprisonment device is utilized, as will hereinafter more fully appear. The manner of operation of the imprisonment device will be explained in connection with the explanation of operation of the system of Fig. 3 below. The permanent magnet ring is closed by a web 33 of thin conducting material, each face of which acts as a capacitor plate. Each electromagnet carries a flat ring 35, 37 and a disc 39, 41, both of which are made of thin conducting material and act as capacitor plates. The ring and disc in each case are coplanar, and their faces lie in planes perpendicular to the electromagnet central axes. The ring in each case is insulated from the electromagnet by a ring 43, 45 of non-conducting material to which it is fixed and which is in turn fixed to the inner face of the electromagnet core. The disc in each case is insulated from the ring by a ring 47, 49 of non-magnetic material to which it is fixed and which is in turn fixed to the ring of conducting material. Each disc carries a terminal 55 and 57 and each conducting ring carries a terminal 51 and 53. A first variable capacitor is formed by the ring and disc associated with one electromagnet together with one face of the conducting web carried by the permanent magnet, and a second variable capacitor is formed by the ring and disc associated with the other electromagnet together with the other face of the said web.

Figure 3:
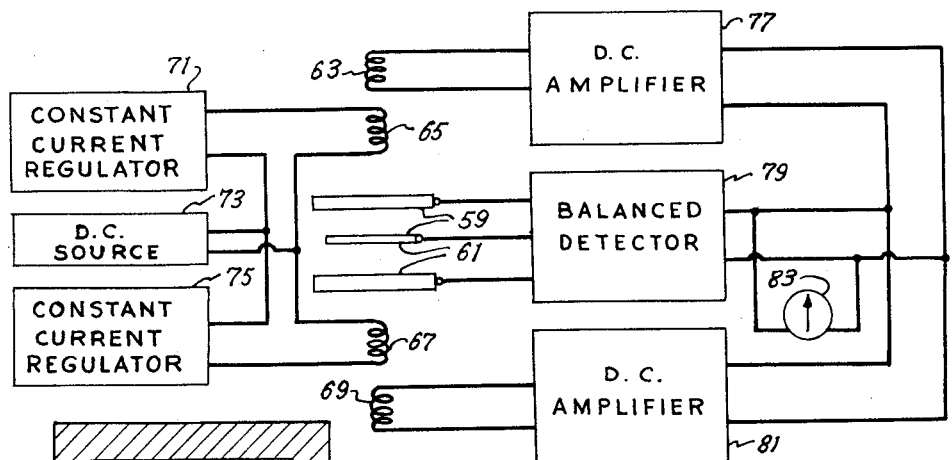
Fig. 3 is a schematic block diagram of an accelerometer utilizing the displacement sensing device of Fig. 1, in accordance with one embodiment of my invention.

Fig. 3 shows an acceleration measuring system which utilizes an imprisonment and relative motion detection device such as that shown by Fig. 1. In Fig. 3, the plates 59 represent the first variable capacitor of Fig. 1, while the plates 61 represent the second. The coils 63, 65 represent the coils of one electromagnet of Fig. 1, while the coils 67, 69 represent the coils of the other. To simplify description and explanation, the coils of Fig. 3 will be hereinafter referred to as the first, second, third, and fourth coil looking from top to bottom in Fig. 3, respectively. The capacitors will be referred to as the first and second capacitor, respectively, looking from top to bottom in Fig. 3. The second coil 65 is connected in series with a first constant current regulator 71 across the output terminals of a direct current power source 73. The third coil 67 is connected in series with a second constant current regulator 75 across the output terminals of said direct current source 73. The first coil 63 is connected to the output terminals of a first direct current amplifier 77 which has input terminals connected to the output terminals of a balanced detector 79. The fourth coil 69 is connected to the output terminals of a second direct current amplifier 81 which has input terminals connected to the output terminals of said balanced detector 79. An indicator device 83 is also connected across the output terminals of said detector 79. The balanced detector has input terminals connected to the terminals of said first and second capacitors 59, 61. The balanced detector may be of a conventional type, arranged to deliver either a possitive, negative, or zero voltage at its output terminals. If the capacitance of the first capacitor is greater than that of the second, then the detector output voltage will be positive; if the capacitance of the second capacitor is greater than that of the first, then the detector output voltage will be negative; and if the capacitance of both capacitors are equal, then the detector output voltage will be zero. The magnitude of the detector output voltage is a function of the relative capacities of the said capacitors. The direct current amplifiers may be of conventional type. The first amplifier 77 responds only to a positive input voltage, while the second amplifier 81 responds only to a negative input voltage. The magnitude of the amplifier output in each case is a function of the magnitude of the input voltage. The indicator device may be a voltmeter of a type in which the pointer is centered on the scale for zero voltage, moves to the right for positive voltage, and to the left for negative voltage. The indicator scale may be calibrated to read accelerations, as will hereinafter more fully appear.

Figure 2:
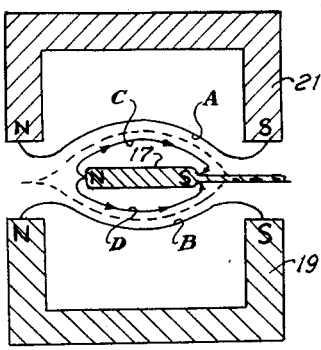
Fig. 2 is a schematic fragmentary sectional view of a portion of Fig. 1, illustrating imprisonment action of the magnetic field.

It is apparent that the electromagnet coils 65, 67 may be energized so that the permanent magnet is suspended in space between the electromagnet pole pieces, without the aid of any mechanical springs or connections. The imprisonment action may be explained with reference to Fig. 2, wherein the electromagnetic field pattern resulting from interaction of the fields emanating from cores 19, 21 of the electromagnets and the permanent magnet 17 is diagrammatically shown. The lines A and B depict the general contour of the primary lines of force between the north and south poles of the respective electromagnets. The lines C and D depict the primary lines of force between the north and south poles of the permanent magnet. The dotted lines represent the locus of balanced or neutral forces of all three magnets. The effect of the permanent magnet upon the fields of the electromagnets is to distort them so that the locus of the balanced forces does not pass through the permanent magnet but goes around it on either side, with the result that there are always present radial as well as transverse forces acting on the permanent magnet so it is restrained against movement in the radial as well as the transverse directions. The permanent magnet 17 is thus imprisoned in space without the use of any springs or other mechanical connections.

In operation of the system of Fig. 3, the second and third coils 65, 67 of the electromagnets are first energized with the system at rest, and the first and second constant current regulators 71, 75 are adjusted until the balanced detector output voltage is zero. This means that the capacitances of the first and second capacitors are equal, which also means that the permanent magnet 17 is centered between the electromagnets. The permanent magnet may be considered as a mass, and the electromagnets as a reference frame. Thus, there have been imposed on the mass restraining forces sufficient to hold the mass in a predetermined position with respect to the reference frame when there is no relative motion between the mass and the frame. The system of Fig. 3 is capable of measuring acceleration in either of the two axial directions of the motion detection device. First, assume that a constant accelerating force is applied to the reference frame in the upward direction in Fig. 3. This will cause the mass to tend to move toward the lower part of the reference frame, causing the second capacitor 61 to increase its capacitance. Then the balanced detector output will be a negative voltage, causing the second direct current amplifier 81 to function to cause current flow in the fourth coil 69. Current flow in the fourth coil increases the strength of the lower electromagnet 15, generating a restoring force acting on the permanent magnet 17 in the upward direction to oppose the effect of the accelerating force and tending to move the mass back toward the center position. Now if no restoring force had been generated, physical limits permitting, the mass would have moved a certain relatively great distance toward the lower part of the reference frame until it came to rest at a position representing a new balance of forces. The total displacement of the mass would then be a measure of the magnitude of the accelerating force. However, due to the amplification in the system, the mass will come to rest at a position only slightly displaced from the center position. The total displacement is the displacement that would have occured had there been no restoring force applied, divided by the amplification factor for the system. If it were possible to achieve infinite gain in the amplifier loop, this displacement could be reduced to zero. Since the detector output voltage in this case was negative, the indicator pointer will move to the left, thus indicating both the sense and the magnitude of the acceleration force that was applied. Of course, the indicator will read more or less as the magnitude of the applied accelerating force is increased or decreased. Now assume that a constant accelerating force is applied in the downward direction in Fig. 3. This will cause the mass to move upward, increasing the capacitance of the first capacitor 59, causing the detector output to be positive, causing the first amplifier 77 to function, causing current flow in the first coil 63 to generate a restoring force in the downward direction opposing the effect of the applied accelerating force. The mass will come to rest at a position representing a new balance of forces, slightly above center. The indicator pointer will move to the right and will indicate the magnitude of the applied accelerating force. Of course, the indicator will read more or less as the accelerating force increases or decreases in magnitude.

Fig. 4 shows an acceleration and velocity measuring system in accordance with another embodiment of my invention, which may utilize an imprisonment and relative motion detection device such as that shown by Fig. 1. In Fig. 4, the plates 59 represent the first variable capacitor of Fig. 1, while the plates 61 represent the second. In the system of Fig. 4, only one coil is required for each electromagnet of Fig. 1. The coil 63 represents a coil of one electromagnet of Fig. 1, while the coil 69 represents the other. For clarity, the coils of Fig. 4 will be hereinafter referred to as the first and second coil looking from top to bottom in Fig. 4, respectively. The capacitors will be referred to as the first and second capacitor, respectively, looking from top to bottom in Fig. 4. The first and second coils are connected in parallel to output terminals of a multivibrator 85. Output from the multivibrator is also connected to trigger a one-shot multivibrator 87, which has its output connected to trigger a gate device 89. The terminals of the first and second capacitors are connected to the input of a balanced detector 91 which has its output connected to the input of the gate device 89. The output of the gate device is fed to an acceleration indicator 93. The acceleration indicator output is fed to an integrator 95. The balanced detector 91 may be a conventional type like that described above in connection with Fig. 3, producing positive output voltage when the capacity of the first capacitor 59 is greater than that of the second 61; negative output voltage when the capacity of the second capacitor is greater than that of the first; and zero output voltage when the capacitances of the capacitors are equal. The multivibrator 85 may be of a conventional free-running type whose output is a periodic square wave. The one-shot multivibrator 17, the gate device 89, and the integrator 95 may also be conventional type components. The one-shot multivibrator is triggered by the free-running multivibrator 85 and puts out one square wave pulse of predetermined duration each time it is triggered. The duration of this pulse depends upon the circuit constants of the one-shot multivibrator. Each output pulse of the one-shot multivibrator opens the gate device for an interval of time determined by the pulse length. During intervals when the gate device is open, output from the detector passes to the acceleration indicator 93. The acceleration indicator may be a peak reading voltmeter that can indicate the peaks of either positive or negative input voltages.

In operation of the system of Fig. 4, the free-running multivibrator 85 acts to cause periodic energization of the electromagnet coils. As before, the permanent magnet 17 and its web 33 may be considered as a mass, and the electromagnets 13, 15 as a reference frame. The magnitude of the output pulses from the free-running multivibrator is sufficient to cause the mass to be clamped to a predetermined position for each said pulse under the condition of maximum acceleration of said frame with respect to said mass. For each interval of time between the free-running multivibrator pulses, the mass is unrestrained and is as a free body in space. For a predetermined time after each clamping pulse and before the next one, the gate device is held open, allowing signals to pass from the balanced detector 91 to the acceleration indicator 93. Assume that accelerating forces are being applied to the reference frame in the direction from top to bottom in Fig. 4. At the end of a given clamping pulse, the mass will begin to move upward toward the upper part of the reference frame and will move at a rate determined by the magnitude of the accelerating force. The plates of the first capacitor 59 will of course move closer together at a like rate, so that the voltage at the output of the detector will be positive and increasing at a rate which is proportional to the change of capacitance of the first capacitor. Since the gate device is held open for a predetermined time interval, then the peak magnitude that the detector output voltage has reached at the time the gate is closed is a measure of the acceleration of the reference frame with respect to the mass during the measuring interval, and the peak reading voltmeter can accordingly be calibrated to read in terms of acceleration. Operation is the same for the case of accelerating forces in the opposite direction except that the detector output voltage is negative, and the acceleration indicator pointer will move in the negative direction instead of the positive. Thus, for successive measuring periods, the acceleration indicator will continuously give instantaneous sense and magnitude of accelerating forces that are applied to the reference frame in the axial directions. During the time intervals when the gate is open, the output of the acceleration indicator 93 passes to the integrator 95. For a given measuring interval, the integral of the voltage output of the acceleration indicator is a measure of the average velocity of the mass during the measuring interval. The integrator output is then fed to an indicator device 97 which can be calibrated to read velocity.

Fig. 5 shows an acceleration measuring system in accordance with another embodiment of my invention and which may utilize an imprisonment and relative motion detection device such as that shown by Fig. 1. In Fig. 5, the plates 59 represent the first variable capacitor of Fig. 1, while the plates 61 represent the second. In the system of Fig. 5, only one coil is required for each electromagnet of Fig. 1. The coil 63 represents a coil of one electromagnet of Fig. 1, while the coil 69 represents the other. For clarity, the coils of Fig. 5 will be hereinafter referred to as the first and second coil looking from top to bottom in Fig. 5, respectively. The capacitors will be referred to as the first and second capacitor, respectively, looking from top to bottom in Fig. 5. The first and second coils are connected in parallel to the output terminals of a one-shot multivibrator 99. The terminals of the first and second capacitors are connected to the input of a balanced detector 101, the output of which is fed to each of two voltage comparators 103, 105. The balanced detector may be of a conventional type like that described in connection with Fig. 3, producing positive output voltage when the capacity of the first capacitor 59 is greater than that of the second; negative output voltage when the capacity of the second capacitor 61 is greater than that of the first; and zero output voltage when the capacitances of the capacitors are equal. The magnitude of the detector output voltage varies in accordance with the change in capacity of the capacitors. The voltage comparators may be of a conventional type wherein the input voltage is compared with a predetermined voltage to produce an output signal when the two voltages achieve a predetermined relationship. In the case of Fig. 5, the upper voltage comparator 103 is responsive only to positive input voltages, while the lower comparator 105 is responsive only to negative input voltages. The comparator outputs are fed to identical conventional type pulse generators 107, 109, the outputs of which are fed to a common pulse shaper 111. The upper pulse generator 107 in Fig. 5 will generate a positive pulse responsive to output from its comparator 103, and the lower pulse generator 109 will generate a negative pulse responsive to output from its comparator 105. The pulse shaper 111 acts to produce a sharp output pulse, either positive or negative, depending upon which pulse generator its input pulse came from. The output pulses of the pulse shaper are fed to the vertical plates of a cathode ray indicator 113, and also to the input of a trigger device 115. The trigger device is such that it generates the same type output pulse for both positive and negative input pulses. The trigger device output passes to an input of the one-shot multivibrator 99, and also through a time delay device 117 to an input of a cathode ray tube gate device 119. The output of the trigger device 115 acts to trigger the multivibrator 99 to the "on" state and also to close the CRT gate 119. The CRT (cathode ray indicator) gate operates on the grid of the cathode ray tube to prevent electrons from striking the tube face except when the gate is open. A sweep generator 121 has its output connected to the horizontal plates of the cathode ray tube 113. The one-shot multivibrator 99 generates an output signal when it reverts to the "off" state, and this output is fed to the CRT gate 119 and also to the sweep generator 121, acting to open the gate and to start the sweep generator.

In operation of the system of Fig. 5, the one-shot mutivibrator 99 acts to energize the electromagnet coils 63, 69 during spaced time intervals. As before, the permanent magnet 17 and its web 33 may be considered as a mass, and the electromagnets 13, 15 as a reference frame. The magnitude of the output of the one-shot multivibrator is sufficient to cause the mass to be clamped to a predetermined position during each "on" state interval under the condition of maximum acceleration of said frame with respect to said mass. For each interval of time during which the multivibrator is in the "off" state, the mass is unrestrained, and is as a free body in space. Assume that accelerating forces are being applied to the reference frame from top to bottom in Fig. 5. At the end of a given clamping interval, the mass will begin to move upward toward the upper part of the reference frame and will move at a rate determined by the magnitude of the accelerating force. The plates of the first capacitor 59 will move closer together at a like rate, so that the voltage at the output of the detector 101 will be positive and increasing at a rate which is proportional to the change of capacitance of the first capacitor. The detector output voltage will reach the critical magnitude for which its comparator 103 is set to produce an output signal in a period of time which is dependent upon the rate of its increase. Now this time period is a function of the acceleration of the reference frame with respect to the mass for the particular time interval under consideration, and its measurement is presented on the cathode ray tube as an acceleration indication. The comparator output signal actuates its pulse generator 107, sending a sharp positive pulse to the cathode ray tube vertical plates. Now at the instant the mass was set free by reversion of the multivibrator to the "off" state, the multivibrator 99 produced a trigger output which acted to trigger the CRT gate 119 open and the sweep generator 121 on. The sweep generator then, at zero (instant of mass unclamping) time started a horizontal trace on the face of the cathode ray tube 113. Then at the critical time (the instant the detector output reached critical magnitude) a positive pulse was applied to the cathode ray tube, creating a sharp upwardly extending pip. The distance out on the trace at which the pip appears then corresponds to the period of time it took the detector output to reach critical magnitude, and therefore also to a certain acceleration. It is apparent that the cathode ray tube horizontal scale may be calibrated to read directly in terms acceleration. Had the assumed acceleration forces been acting in the upward direction, then the lower comparator 105 would have responded and a negative, or downwardly extending pip would have appeared on the acceleration scale of the cathode ray tube. The pulse shaper output also acts through the time delay device 117 to close the CRT gate 119 and to return the multivibrator 99 to the "on" state. It is apparent from the foregoing that the system of Fig. 5 is capable of producing continuous indications of acceleration in both of the electromagnet axial directions.

Figure 6:
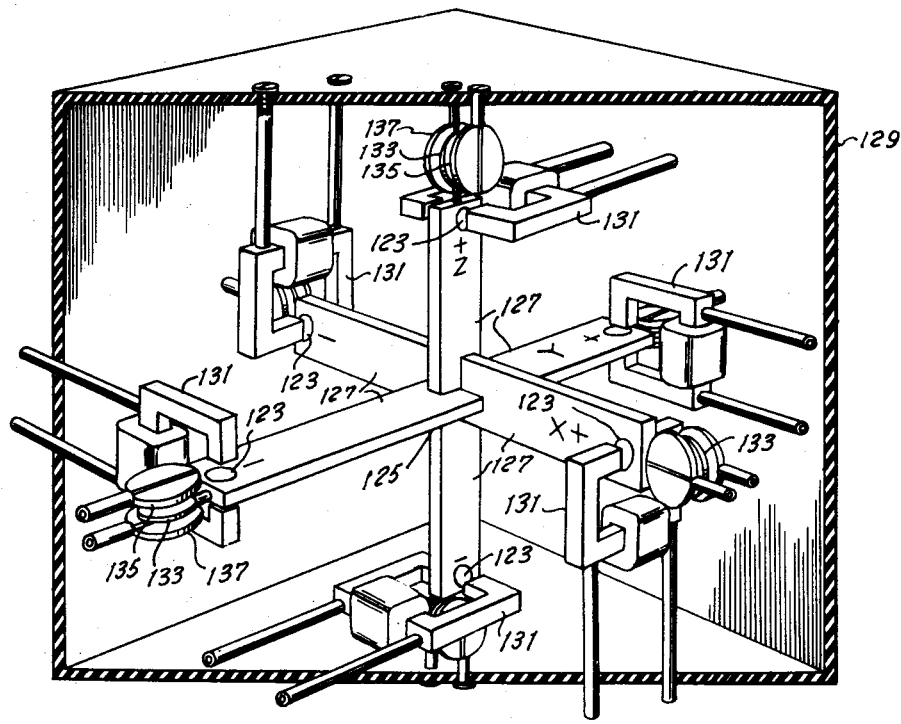
Fig. 6 is a schematic perspective view of a magnetic suspension and displacement sensing device in accordance with another embodiment of my invention.
Figure 7:
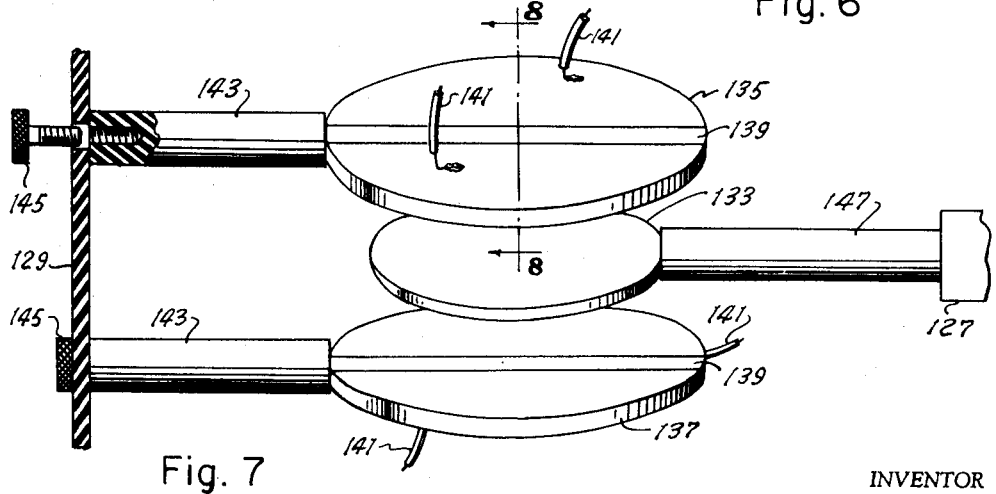
Fig. 7 is an enlarged fragmentary view of a portion of Fig. 6, showing details of a typical sensing plate arrangement.
Figure 8:
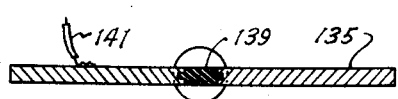
Fig. 8 is a section view taken along lines 8—8 of Fig. 7.

Fig. 6 shows a magnetic suspension or imprisonment device, which is capable of imprisoning a mass so that the mass may be restrained against rotation in either direction about all of three mutually perpendicular axes, and which also is capable of sensing relative motion of the mass with respect to a frame in all directions along said axes and in all directions of rotation about said axes. In Fig. 6, there is shown a mass comprising six permanent magnets 123 carried by a permanent magnet support structure 125 of "jack-straw" configuration. The support structure is rigid and has six arms 127 extending symmetrically outward from a center point, each in a different direction along one of three mutually perpendicular axes. The axes are designated as the X, Y, and Z axes in accordance with conventional notation. It should be noted that the support structure could take other shapes. An octahedron for example, would provide a light rigid structure having apices on three mutually perpendicular axes, and would be well suited for use as a support structure. Each arm 127 of the support structure 125 carries a permanent magnet 123 adjacent its outer end. The permanent magnets are equidistant from the axes' origin. The mass is surrounded by a rigid outer frame 129, which carries twelve electromagnet poles, formed by six electromagnets 131. Each electromagnet is arranged to cooperate with one of the permanent magnets, with the permanent magnet lying between the electromagnet poles, and with like poles adjacent so that repelling forces are exerted on the permanent magnet when the electromagnet is energized. The magnets associated with the X axis arms are disposed so that the mass is restrained against motion in the Y axis directions, and against rotation about the Z axis; the magnets associated with the Y axis are disposed so that the mass is restrained against motion in the Z axis directions, and against rotation about the X axis; and the magnets associated with the Z axis are disposed so that the mass is restrained against motion in the X axis directions, and against rotation about the Y axis. Supported from the end of each arm of the permanent magnet support structure is a thin metal plate 133 which is a part of a sensing capacitor. This plate in each case lies in a plane perpendicular to the axis of restraint of the associated arm. For example, the plates fixed to the X axis arms lie in a plane perpendicular to the Y axis. The plates just mentioned will be hereinafter called the movable plates. Each movable plate 133 has associated with it a pair of fixed plates 135, 137 which in each case lie on opposite sides of the movable plate, are parallel to the movable plate when it is in the neutral position, and are carried by the electromagnet support frame. Each fixed plate is divided into equal parts by insulation 139, and each part carries a terminal 141. The plates are preferably disc-shaped, and the fixed plates 135 are each larger in area than the associated movable plate 133. Fig. 7 shows that the fixed plates 135, 137 are each held by a tubular rod 143 which is fixed to a wall of the electromagnet support frame 129 by means of a screw 145; and that the movable plates 133 are each held by a tubular rod 147 which is fixed to the end of an arm 127 of the permanent magnet support structure 125.

The operation of the magnetic suspension or imprisonment device of Fig. 6 will now be explained in connection with description of a motion detection system shown by Fig. 9. In Fig. 9, six sets of capacitor plates are shown, which represent the capacitor sensing elements 133, 135 of the imprisonment device of Fig. 6. The center plate in each case represents the movable plate 133; the lower plate 135 represents the plate on the positive direction side of the center plate in each case; and the upper plate 137 represents the plate on the negative direction side of the center plate in each case. There are also shown six coils, which represent the coils 148 of the six electromagnets of Fig. 6. In addition, there are shown six detectors 149; six gate devices 151; six mixers 153; and six indicator devices 155. The coils 148, capacitors sets 133, 135, 137, detectors 149, and gate devices 151 will hereinafter be referred to as the first, second, etc., reading from top to bottom in Fig. 9. Each coil 148 is connected across the output terminals of a "free-running" multivibrator 157, which also has an output connection to the input of a one-shot multivibrator 159, which has an output connection to an input of each gate device 151. The terminals of each set of capacitor plates are connected to the input of a respective detector 149, which has its output connected to the input of a corresponding gate device 151. The detectors may be of a conventional type, each producing a pair of output voltages which vary in magnitude in accordance with the degree of relative motion between the capacitor plates. Thus each detector has two separate outputs which also appear as separate outputs of a corresponding gate device when the gate is open. Herein, a gate output is called a first output when it is derived from the center and upper plates of a capacitor set 133, 137; and a second output when it is derived from the center and lower plates 133, 135 of a capacitor set. Now the first and second; third and fourth; fifth and sixth capacitor sets correspond to those on the X, Y, and Z axes respectively of the imprisonment device of Fig. 6, with the first, third, and fifth sets being on the positive sides of the respective axis. The first outputs of the first and second gate devices are fed to the inputs of a first mixer; the first outputs of the third and fourth gate devices are fed to the inputs of a second mixer; and the first outputs of the fifth and sixth gate devices are fed to the inputs of a third mixer. The second output of the first gate and the first output of the second gate are fed to a fourth mixer; the second output of the third gate and the first output of the fourth gate are fed to the inputs of a fifth mixer; and the second output of the fifth gate and the first output of the sixth gate are fed to the inputs of a sixth mixer. The mixers 153 may all be conventional type devices that are capable of deriving a positive or negative difference voltage from a pair of input voltages. The first, second, and third mixers act to subtract their respective second, fourth, and sixth gate first outputs from their respective first, third, and fifth gate first outputs. The fourth, fifth, and sixth mixers act to subtract their respective first, third, and fifth gate second outputs from their respective second, fourth, and sixth gate first outputs. The output of each mixer 153 is fed to a respective indicator device 155.

The free-running multivibrator 157 may be of a conventional type whose output is a periodic square wave of sufficient magnitude to clamp the mass to neutral position under the condition of maximum acceleration. The one-shot multivibrator 159 and the gate devices 151 may also be conventional type components. The one-shot multivibrator 159 is triggered by the free-running multivibrator 157 and puts out one square wave pulse of predetermined duration each time it is triggered. The duration of this pulse depends upon the circuit constants of the one-shot multivibrator. Each output pulse of the one-shot multivibrator opens the gate devices 151 for an interval of time determined by the pulse length. During intervals when the gate devices are open, outputs from the detectors 149 pass to the respective mixers and indicators. The indicator devices may in each case be peak reading voltmeters that can indicate either positive or negative peak magnitudes.

For an example of the operation of the system of Fig. 9 utilizing the imprisonment device of Fig. 6, assume that an accelerating force is applied to the frame 129 causing the frame to move downward, inward, and to the left. Assume that at the same time an acceleration force is applied to cause the mass to rotate about the X-axis in a clockwise direction with respect to the frame. The mass would then tend to move upward, outward, and to the right with respect to the frame. Thus there will be components of acceleration in the positive directions on all three axes of the mass. The accelerating forces cause the plates of the sensing capacitors to have relative motion such that the fourth, fifth, and sixth mixers will all have positive output voltages whose peak magnitudes are a function of the respective acceleration components. Thus the associated indicator devices will read the direction and magnitude of the components of the applied accelerating force. At the same time, the first and third mixers will have zero output, while the second mixer will have a positive output whose peak magnitude is a function of the applied rotational accelerating force, and the associated indicator devices will read accordingly. In summary, the indicators associated with the fourth, fifth, and sixth mixers will read the direction and magnitude of acceleration forces acting along the X, Y, and Z axes respectively; while the indicators associated with the first, second, and third mixers will read the direction and magnitude of rotational accelerating forces acting to cause rotation about the X, Y, and Z axes, respectively. If velocities are desired, they may be obtained by adding integrating components to the circuit of Fig. 9. The systems of Figs. 3 and 5 may also be adapted for use with the imprisonment device of Fig. 6.

While I have shown my invention in several forms, it will be obvious to those skilled in the art that it is not so limited, but is susceptible of various changes and modifications without departing from the spirit thereof.

I claim:

1. A mass, a reference frame, means for imposing restraining forces on said mass sufficient to move said mass to a predetermined position with respect to the said frame under the condition of maximum acceleration of said frame with respect to said mass, means for applying said restraining forces for a period of time at spaced time intervals so that said restraining forces are removed periodically for predetermined periods of time, and means for measuring the degree of relative motion between said frame and said mass during the time intervals when said restraining forces are not applied.

2. A mass, a reference frame, means for imposing restraining forces on said mass sufficient to move said mass to a predetermined position with respect to the said frame under the condition of maximum acceleration of said frame with respect to said mass, means for applying said restraining forces for a period of time at predetermined spaced time intervals so that said restraining forces are removed for predetermined periods of time, and means for measuring the degree of relative motion between said frame and said mass.

3. A mass, a reference frame, means for applying restraining forces on said mass sufficient to move said mass to a predetermined position with respect to the said frame under the condition of maximum acceleration of said frame with respect to said mass, means for applying said restraining forces periodically at predetermined time intervals for a predetermined time, and means for measuring the degree of relative motion between said frame and said mass during time intervals when said restraining forces are not applied.

4. A mass, a reference frame, means for imposing restraining forces on said mass sufficient to move said mass to a predetermined position with respect to the said frame under the condition of maximum acceleration of said frame with respect to said mass, means for applying said restraining forces for a period of time at spaced time intervals said period of time being sufficient to force said mass to said predetermined position, said mass being freed periodically of said restraining forces during predetermined intervals of time, and means for measuring the degree of relative motion between said frame and said mass during time intervals when said restraining forces are not applied.

5. A displacement sensing device comprising a pair of substantially identical rings made of magnetic material and each having an annular slot in one side face, means supporting said rings in axially aligned fixed spaced relation with the slots facing each other, coils arranged in said slots in such manner that when they are energized, like poles of one polarity will be formed at the outer facing surfaces of the rings and like poles of the opposite polarity will be formed at the inner facing surfaces of said rings, a third ring disposed coaxially with and intermediate of said pair of rings and having an outer radius less than and an inner radius greater than the respective outer and inner radii of said pair of rings, said third ring being permanently magnetized so that its outer portion exhibits a pole like those of the outer facing surfaces of said pair and its inner portion exhibits a pole like those of the inner facing surfaces of said pair, conductive plane surface elements carried within a ring of said pair, a conductive plane surface element carried within said third ring and forming a capacitor with said conductive plane surface elements carried within a ring of said pair, whereby the capacitance of said capacitor is a function of the displacement of said third ring with respect to said pair.

6. A magnetic suspension device comprising, six permanent magnets each disposed equidistant from a center point and each pair being disposed on one of three mutually perpendicular axes with one magnet of the pair on each side of the center point and with the poles of each magnet facing in opposite directions, a structure supporting said permanent magnets in fixed relation to each other, an outer frame, twelve magnet poles supported by said frame with each pole facing a like pole of one of said permanent magnets, with said permanent magnets being so oriented that said structure is restrained against rotation about all of said axes, means for varying the strength of said twelve poles, said means including means to periodically clamp said structure in a predetermined position for an interval of time and thereafter allow such structure to be unrestrained for a predetermined interval of time and thereby displaced in response to acceleration, and means for sensing displacement of said structure with respect to said frame.

7. A magnetic suspension device comprising, six permanent magnets each disposed equidistant from a center point and each pair being disposed on one of three mutually perpendicular axes with one magnet of the pair on each side of the center point and with the poles of each magnet facing in opposite directions, a structure supporting said permanent magnets in fixed relation to each other, an outer frame, twelve magnet poles supported by said frame with each pole facing a like pole of one of said permanent magnets, with said permanent magnets being so oriented that said structure is restrained against rotation about all of said axes, means for varying the strength of said twelve poles, said means including means to periodically clamp said structure in a predetermined position for an interval of time and thereafter allow said structure to be unrestrained for a predetermined period of time and thereby displaced in response to acceleration, and means for sensing the displacement of said structure with respect to said frame said means including a variable capacitance means operably conected between said frame and said structure.

8. A magnetic suspension device comprising, six permanent magnets each disposed equidistant from a center point and each pair being disposed on one of three mutually perpendicular axes with one magnet of the pair on each side of the center point and with the poles of each magnet facing in opposite directions, a structure supporting said permanent magnets in fixed relation to each other, an outer frame, twelve magnet poles supported by said frame with each pole facing a like pole of one of said permanent magnets, with said permanent magnets being so oriented that said structure is restrained against rotation about all of said axes, means for varying the strength of said poles, said means including means to periodically clamp said structure in a predetermined position for an interval of time and thereafter allow said structure to be unrestrained for a predetermined period of time and thereby displaced in response to acceleration, and means for producing a signal in response to said unrestrained displacement of said structure with respect to said frame, means for gating said signal for a predetermined time interval and means to register the acceleration.

9. A mass, a reference frame, means for imposing restraining forces on said mass sufficient to move said mass to a predetermined position wtib respect to the said frame under the condition of maximum acceleration of said frame with respect to said mass, means for applying said restraining forces for a period of time at spaced time intervals, means for removing said restraining forces during spaced predetermined time intervals, and means for measuring the degree of relative motion between said frame and said mass during the time intervals when said restraining forces are removed.

10. A mass, a reference frame, means for applying restraining forces on said mass sufficient to move said mass to a predetermined position with respect to the said frame under the condition of maximum acceleration of said frame with respect to said mass, means for applying said restraining forces periodically at predetermined time intervals for a predetermined time, means for periodically removing said restraining forces, and means for measuring the degree of relative motion between said frame and said mass during time intervals when said restraining forces are removed.

11. A displacement sensing device comprising spaced first, second and third members; said first and third members being substantially identical and each of the said first and third members having an electrically conductive disc, a first dielectric band encompassing the periphery of the said disc, a ring of conductive material encompassing the periphery of the said first dielectric band, a second dielectric band encompassing the periphery of said conductive ring, an annular channel member encompassing the said second dielectric band with the inner channel leg being electro-magnetized to one polarity and the outer channel leg being electro-magnetized to the opposite polarity, means to electro-magnetize said channel legs, the respective areas of the said first member being substantially aligned with the corresponding areas of the said third member, the said second member interposed between the said first and third members and comprised of a conductive disc encompassed by a ring of permanently magnetic material, the area near the inner diameter of the said permanently magnetic ring being of one polarity and the area near the outer diameter of the said ring being of opposite polarity, said inner diameters of said ring being greater than the inner diameter of said inner channel leg and said outer diameter of said ring being less than the outer diameter of said channel leg whereby the said second member is suspended and restrained from movement between said first and second members by magnetic force and means associated with the respective conductive disc and conductive ring of the respective first and third members to measure a relative displacement of the said second member with respect to said first and third members and, said means being responsive to the changes of capacitance between said first and second member and the changes of capacitance between said second and third member so that a displacement of said second member with respect to said first and third members may be measured.

12. A magnetic suspension device comprising means to periodically establish and disestablish magnetic fields, said means disestablishing said magnetic fields for predetermined lengths of time, a magnetized body suspended in said magnetic fields and restrained from movement in any direction when said fields are established and unrestrained when said fields are disestablished, a capacitance means comprising a first plate, an intermediate plate and a second plate so arranged that the first plate and intermediate plate constitute a first capacitor and so that the second plate and intermediate plate constitute a second capacitor, means to operably connect said intermediate plate with said suspended magnetized body so that a displacement of the said magnetized body by virtue of external forces will cause the capacitance of one of said capacitors to increase while simultaneously decreasing the capacitance of the other of said capacitors, means associated with said capacitors to register the relative displacement and means to set a predetermined time of registration.

13. A magnetic suspension device for measuring displacement comprising means to periodically establish and disestablish magnetic fields, said means disestablishing said magnetic fields for predetermined periods of time, a magnetized body positioned in said magnetic fields and restrained from movement in any direction during said time the magnetic field is established, a capacitance means comprising a first plate, an intermediate plate and a second plate so arranged that the first plate and intermediate plate constitute a first capacitor and so that the second plate and intermediate plate constitute a second capacitor, means to operably connect said intermediate plate with said suspended magnetized body so that in the time the said magnetized body is clamped the capacitance of each of the capacitors is substantially equal and so that displacement of the said magnetized body by virtue of external forces during the period of time the said magnetized body is not clamped will cause the capacitance of one of said capacitors to increase while simultaneously decreasing the capacitance of the other of said capacitors, and means associated with said capacitors operative upon said variable capacitance to register the relative displacement.

14. In a magnetic suspension device for measuring displacement comprising means to establish magnetic fields, a magnetized body positioned in said magnetic fields, means to periodically cause said magnetic fields to clamp said magnetized body in a predetermined position in said magnetic fields for a predetermined time and to release said magnetized body for a predetermined time whereby the said magnetized body may be displaced by virtue of external forces in said released time period; a gating means; means to open said gating means for a predetermined time, said last mentioned means being actuated by said periodic clamping means at the instant the said clamping means releases said magnetic means; means responsive to the unrestrained movement of said magnetized body to produce an output signal which is a measure of the displacement of said magnetized body for the period of time said gating means is open.

15. A magnetic suspension device for measuring displacement comprising a magnetic means; a means to periodically clamp said magnetic means in a predetermined position in a periodically established magnetic field for a predetermined time and to release said magnetic means for unrestrained movement whereby the said magnetic means may be displaced by virtue of external forces; a cathode ray tube means having vertical and horizontal input means; means operatively connected to one of said input means responsive to said clamping means so that, at the moment of release of said magnetic means, to start a sweep across said cathode ray tube; means responsive to the displacement of said magnetic means to produce an output voltage signal; means responsive to a critical value of said output voltage to produce a pulse signal; means responsive to the pulse signals to actuate the clamping means to clamp the magnetic means; means to operatively connect said pulse signal to the other of said cathode ray tube inputs to thereby produce an indication on said cathode ray tube.

References Cited in the file of this patent

UNITED STATES PATENTS

| | | |
|---|---|---|
| 2,049,129 | McNeil | July 28, 1936 |
| 2,315,408 | Faus | Mar. 30, 1943 |
| 2,316,915 | Truman | Apr. 20, 1943 |
| 2,436,939 | Schug | Mar. 2, 1948 |
| 2,658,805 | Mendelsohn | Nov. 10, 1953 |
| 2,695,165 | Hansen | Nov. 23, 1954 |
| 2,697,594 | Stanton | Dec. 21, 1954 |
| 2,856,238 | Dacus | Oct. 14, 1958 |

FOREIGN PATENTS

| | | |
|---|---|---|
| 539,409 | Great Britain | Sept. 9, 1941 |
| 715,750 | Great Britain | Sept. 22, 1954 |